| United States Patent [19] | [11] Patent Number: 4,752,500 |
|---|---|
| Donado | [45] Date of Patent: Jun. 21, 1988 |

[54] PROCESS FOR PRODUCING STABILIZED MOLTEN CARBONATE FUEL CELL POROUS ANODES

[75] Inventor: Rafael A. Donado, Chicago, Ill.

[73] Assignee: Institute of Gas Technology, Chicago, Ill.

[21] Appl. No.: 847,245

[22] Filed: Apr. 2, 1986

[51] Int. Cl.⁴ ............................................. B05D 5/12
[52] U.S. Cl. .................................. 427/115; 29/623.5; 429/44; 429/45
[58] Field of Search ...................... 427/115; 29/623.5; 429/44, 45

[56] References Cited

U.S. PATENT DOCUMENTS 3,042,551 7/1962 Peny ..................................... 427/115
4,247,604 1/1981 Marianowski ........................ 429/40

FOREIGN PATENT DOCUMENTS 713150 7/1965 Canada ................................ 136/1.54

*Primary Examiner*—John D. Smith
*Assistant Examiner*—Vi Duong Dang
*Attorney, Agent, or Firm*—Thomas W. Speckman; Ann W. Speckman

[57] ABSTRACT

A process for producing stabilized molten carbonate fuel cell porous metal anodes by impregnating a porous metallic anode in an aqueous solution having dissolved therein a water soluble salt of a structure stabilizing agent; drying the impregnated porous anode to evaporate free water and form hydrated salts of the stabilizing agent on the surface of the metal particles, further heating the impregnated dried porous anodes to dehydrate the hydrated compounds on the surface of the metal particles, and heating the porous anodes to a temperature of about 600° to about 700° C. in a reducing atmosphere forming particles of the stabilizing agent on the surface of the metal particles. Suitable stabilizing agents include water soluble salts of chromium, zirconium, aluminum, and mixtures thereof. The porous metallic anodes produced according to this process provide stability against sintering and creep resistance during molten carbonate fuel cell operation.

31 Claims, No Drawings

PROCESS FOR PRODUCING STABILIZED MOLTEN CARBONATE FUEL CELL POROUS ANODES

BACKGROUND OF THE INVENTION

1. Field of the Invention

The present invention relates to molten carbonate fuel cells and particularly to porous anode electrodes therefor which contact alkali metal carbonates electrolytes over long periods of high temperature fuel cell operation. The present invention more specifically relates to a process for producing stabilized molten carbonate fuel cell anodes principally comprising metallic nickel, cobalt, copper, or mixtures thereof, by impregnating the metallic anode in an aqueous solution having dissolved therein a water soluble salt of a structure stabilizing agent which is deposited on the metallic surfaces and subsequently crystallized by heat treatment to uniformly distribute fine crystals of stabilizing agent over the surface area of a porous anode to impart stability against sintering and creep resistance to the anode during molten carbonate fuel cell operation.

Molten carbonate fuel cells generally comprise two electrodes, a cathode and an anode, with their current collectors, an electrolyte tile contacting both electrodes, a cell housing to physically retain the cell components and an external circuit. Fuel cells produce electrical energy by converting chemical reactants continuously supplied to the electrodes from an external source to electrical energy. Fuel cells "burn" or "combust" fuel comprising hydrogen or an active fuel electrochemically to produce electrical energy, carbon dioxide and steam. Under normal molten carbonate fuel cell operating conditions, in the temperature range of about 500° to 700° C., the entire electrolyte tile, the carbonate electrolyte and the inert support material forms a paste and thus electrolyte diaphragms of this type are known as paste electrolytes. The electrolyte is in direct contact with the electrodes where three phase reactions (gas - electrolyte - electrode) take place. Hydrogen is oxidized at the anode to produce water, carbon dioxide and electrons, while an oxidant, typically oxygen and carbon dioxide, is reduced at the cathode. Electrons released at the anode flow to the cathode through an external circuit, producing the desired current flow. Molten carbonate fuel cells typically utilize a binary or ternary electrolyte system comprising lithium and sodium or potassium carbonates.

2. Description of the Prior Art

Porous anodes comprising principally metallic cobalt or nickel are conventionally used in molten carbonate fuel cells. Suitable porous anodes may be produced from fine metallic powders using powder metallurgical techniques to form a green compact having void spaces between the particles, the void spaces forming interconnected pore channels throughout the compact. The green compact is then sintered by heating at temperatures of greater than about 70 percent of the melting point temperature of the constituent metal. This technique produces anodes having pore channels distributed throughout their structure.

Reduced molten carbonate fuel cell power output has been observed after only a few hundred hours of fuel cell operation when porous cobalt, nickel and copper anodes are utilized. Molten carbonate fuel cell power output loss after relatively short periods of operation appears to be related to the diminished surface area and loss of porosity of the porous anode. It is believed that changes in pore structure result from sintering of the metallic anode constituents due to the high temperatures maintained during molten carbonate fuel cell operation.

Various techniques have been developed to increase and maintain the porosity of electrode materials in an effort to maintain fuel cell power output over longer periods of operation. One method incorporates an alkali soluble material such as aluminum, silicon or boron in the electrode material, as taught by U.S. Pat. Nos. 3,359,099 and 3,414,438. The Raney-type electrodes produced according to these teachings, however, exhibit the same long term instability under molten carbonate fuel cell operating conditions as other porous nickel or cobalt anodes, although they may exhibit greater initial porosity.

Another method for producing high surface area electrodes for molten carbonate fuel cells utilizes electrodes having metal fiber wicks, as described in U.S. Pat. No. 3,826,686.

It is known from the principles of general powder metallurgy to incorporate critical amounts of specific sized inert dispersoid particles in a base metal to produce porous sintered metal materials suitable for uses such as fluid flow distributors and filters as taught by U.S. Pat. No. 3,397,968. This patent teaches that sintered articles produced with inert dispersoid particles are dimensionally stable with respect to overall shapes and sizes. Belgian Pat. No. 849,639 teaches the use of conductive dispersoid particles of chromium, molybdenum, tungsten, and mixtures thereof, to produce thermally stable sintered porous metal structures for use as high temperature heating elements, conductive metallic grids, batteries and conductive elements for electrostatic precipitations. The teachings of these patents do not relate to fuel cell anode use and they do not relate to anode stability under molten carbonate fuel cell operating conditions. For example, combination of nickel with a dispersed phase of magnesium oxide or calcium oxide taught to produce overall dimensional stability by both U.S. Pat. No. 3,397,968 and by the article "Sintering of Metal Powder Compacts Containing Ceramic Oxides", M. H. Tikkanen et al, Power Metallurgy, No. 10, pp. 49–60 (1962), does not result in a suitable porous anode providing surface area stability under molten carbonate fuel cell operating conditions.

U.S. Pat. No. 4,247,604 teaches a method of stabilizing porous anodes comprising principally nickel, cobalt, or mixtures thereof, for use in molten carbonate fuel cells. This patent teaches the addition of less than about 20 weight percent, of a solid, particulate surface area stabilizing agent selected from the group consisting of: chromium, zirconium and aluminum in powdered metal, oxide or alkali metal salt forms, and mixtures thereof. The solid, particulate stabilizing agent is mixed with and distributed throughout the primary anode metallic material prior to sintering. Metallic chromium particles approximately 3–5$\mu$ in diameter are mixed with metallic base material particles approximately 3–7$\mu$ in diameter prior to sintering to stabilize the pore structure of nickel or cobalt porous anodes. This process yields generally satisfactory results in terms of maintenance of fuel cell power output, but the cost of producing porous molten carbonate fuel cell anodes according to this method is too high for many applications.

European patent application No. 83108159.1 teaches production of electrodes for molten carbonate fuel cells by addition of an alkali and/or alkaline earth hydroxide to the electrode which is subsequently heat-treated in a carbon dioxide environment at about 100° C. to convert the hydroxide to a carbonate. A ceramic oxide may also be added by conventional processes to react with the hydroxide to provide sintering resistance and greater carbonate retaining capability.

U.S. Pat. No. 4,239,557 teaches a method for producing porous sintered metal articles, especially nickel articles, which exhibit thermal stability and high conductivity at elevated temperatures. Metallic particles of the base material are combined with active or conductive dispersoid particles to provide uniform distribution of the dispersoid particles, a compact is formed, and the article is sintered at a temperature corresponding to approximately 75 percent of the melting point of the base metal. The sintered article may be compacted to produce the desired degree of porosity, and the compacted article is then subjected to an annealing process. This process is taught for producing a porous sintered metallic anode wherein the base metal comprises nickel and the dispersoid particles comprise chromium.

U.S. Pat. No. 4,361,631 discloses an electrode material for use with molten carbonate fuel cells comprising non-sintering substrate particles electroless plated with an electrochemically active metal. The metal encapsulated non-sintering particles are utilized to form electrodes for molten carbonate fuel cells. U.S. Pat. No. 4,317,866 teaches a molten carbonate fuel cell ceria anode which is formed by ceramic forming techniques of firing and compression molding.

SUMMARY OF THE INVENTION

It is an object of the present invention to provide improved molten carbonate fuel cell porous anodes comprising principally metallic nickel, cobalt, copper or mixtures thereof, which exhibit structural stability over long periods of high temperature molten carbonate fuel cell operation.

It is another object of the present invention to provide a method for uniformly distributing fine particles of a stabilizing agent over the surface area and throughout the pore structure of a porous anode for use in molten carbonate fuel cells by impregnating the porous anode in an aqueous solution having dissolved therein water soluble salts of a stabilizing agent which is deposited on the metallic surfaces and then crystallizing the structure stabilizing agent on the metallic surfaces by heat treatment to uniformly distribute fine particles of structure stabilizing agent throughout the pore structure of the porous anode.

It is still another object of the present invention to uniformly cover the entire surface area of a fuel cell porous anode with fine particles of a structure stabilizer to provide improved structural stability and creep resistance of a molten carbonates fuel cell anode at a low cost.

Cobalt, nickel and copper metals, and mixtures thereof, are suitable base metals for molten carbonates fuel cell anode electrodes, since they are not oxidized at anode conditions and they possess good electrocatalytic properties, high exchange current density, and good electrical conductivity. Of the three metals, copper is preferred because of its lower cost and because it can be polarized to a greater extent before oxidation onset. The low strength of copper, however, results in unacceptably high levels of deformation and loss of surface area and porosity during molten carbonates fuel cell operation, and therefore copper must be alloyed or reinforced to provide a suitable base metal for a porous anode electrode. Between nickel and cobalt, nickel is lower cost and can be polarized more than cobalt and is, therefore, preferred. All three of these metals, copper, cobalt and nickel, and mixtures thereof, are suitable for use with the process of the present invention.

Stabilization of the pore structure of porous anode electrodes is necessary to prevent excessive grain growth, sintering, creep and loss of porosity and surface area, as well as pore size enlargement which take place under normal molten carbonate fuel cell operating conditions. Maintaining a high surface area, greater than about 0.09 and up to as high as about 0.5 to about 12 square meters per gram, and mean pore diameters from less than 1 to about 20 microns, of a molten carbonate fuel cell anode is of great importance to efficient fuel cell operation. Metallic chromium, which is presently used by mixing particles with particles of the metallic base material, is not stable in the anode environment during molten carbonates fuel cell operation. Chromium metal is oxidized to chromic oxide ($Cr_2O_3$) during or prior to fuel cell operation, and the chromic oxide ($Cr_2O_3$) reacts with alkali metal carbonates present in the molten carbonates electrolyte, particularly lithium carbonate ($Li_2CO_3$), to form alkali metal salts, particularly lithium chromite ($LiCrO_2$) which is believed to be the actual stabilizing compound. The terminology "stabilizing agent" as used throughout this disclosure and claims is meant to include the actual structure stabilizing compound and the precursor chemical compounds.

Stabilization of a molten carbonates fuel cell porous anode is achieved, according to the present invention, by the uniform distribution over the entire surface area of a porous anode, reinforced or not, of fine particles of a structure stabilizing agent which maintains or enhances the surface area and porosity of the fuel cell anode during molten carbonate fuel cell operation. "Stability", as used in this disclosure and the appended claims, relates to maintenance of high anode surface area, high porosity with small pore size, and low creep.

According to the present invention, conventionally formed high surface area, highly porous fuel cell anodes comprising a suitable base metal or base metal alloy are impregnated in an aqueous solution having dissolved therein a water soluble salt of a structure stabilizing agent, preferably a saturated solution, to deposit the structure stabilizing agent salt uniformly on the metallic particle surfaces throughout the pore structure of the porous anode. The porous anodes are dried and then heat treated in a hydrogen-rich environment to dehydrate and crystallize the structure stabilizing agent, preferably lithium chromite, lithium aluminate or lithium zirconate, on the surface of the porous anode. Impregnating porous fuel cell anodes with a water soluble salt of a structure stabilizing agent by soaking in an aqueous solution having dissolved therein the surface stabilizing agent and subsequent crystallization of the stabilizing agent provides porous anodes having metal particles uniformly covered with fine particles of the desired stabilizing agent.

Water soluble salts of stabilizing agent suitable for use with the present invention are readily obtainable and relatively inexpensive, particularly compared with particulate metallic surface area stabilizing agents. Uniform distribution throughout the pore structure of very finely divided crystals of stabilizing agent provides porous anodes which demonstrate improved structural stability during long term molten carbonates fuel cell operation and thus provides high and steady molten carbonate fuel cell power output during long term operation.

DESCRIPTION OF THE PREFERRED EMBODIMENTS

According to the process of the present invention, conventionally prepared highly porous metallic anode electrodes suitable for use in molten carbonates fuel cells are treated by soaking in aqueous solutions having dissolved therein salts of a structure stabilizing agent. The concentration of dissolved salts of stabilizing agent in aqueous solution must be sufficient to ensure that dissolved salts are deposited uniformly on the surface of the porous anode immersed in the solution.

Any water soluble compound effective as a structure stabilizing agent for a highly porous metallic anode under molten carbonate fuel cell operating conditions is suitable for use in this invention. Particularly preferred are water soluble salts of stabilizing agents selected from the group consisting of chromium, zirconium, aluminum, and mixtures thereof. Suitable water soluble salts include lithium chromate ($Li_2CrO_4$), lithium dichromate ($Li_2Cr_2O_7$), potassium chromate ($K_2CrO_4$), potassium dichromate ($K_2Cr_2O_7$), sodium chromate ($Na_2CrO_4$), sodium dichromate ($Na_2Cr_2O_7$), chromic formate ($C_3H_3CrO_6$), chromous acetate ($C_4H_6CrO_4$), chromous formate ($C_2H_2CrO_4$), chromous oxalate ($C_2CrO_4$) and mixtures thereof. Salts of aluminum and zirconium soluble in water, such aluminum nitrate ($Al(NO_3)_3$) and zirconium nitrate ($Zr(NO_3)_4$), can be used to deposit fine crystals of aluminum oxide ($Al_2O_3$) or zirconium oxide ($ZrO_2$) after decomposition of the salt. Aluminate or zirconate of lithium ($LiAlO_2$ or $LiZrO_3$) will be formed in situ by reaction with the lithium carbonate. Also, potassium aluminate ($KAl_2$), also known as potassium aluminum oxide ($Al_2O_3K_2O$), can be used and, either treated with a solution of lithium hydroxide to form the lithium aluminate, or allow the aluminate to be formed in situ by ion exchange reaction. Lithium chromate ($Li_2CrO_4$) and lithium dichromate ($Li_2Cr_2O_7$) are especially preferred for use in the process of the present invention. It should be noted that the hydroxide compounds as taught by European patent application No. 83108159.1 cited above are substantially water insoluble.

Conventionally prepared porous anode electrodes with or without reinforcement are immersed and soaked in an aqueous solution having dissolved therein stabilizing agent compounds, such as lithium chromate ($Li_2CrO_4$), lithium dichromate ($Li_2Cr_2O_7$), and a mixture of water soluble chromium, aluminum, and zirconium compounds. Saturated aqueous solutions of dissolved salts of structure stabilizing agent are preferred for use in the process of the present invention to provide a high concentration of dissolved salts. Suitable soaking times range from about 1 to about 15 minutes at room temperature. Vacuum may be applied to aid the impregnation process. Porous anodes may be immersed and/or soaked a number of times, sequentially, in the solution of stabilizing agent to promote uniform distribution and high concentration of chromium, aluminum and zirconium salts over the entire surface area throughout the pore structure of the porous anode. Preferably after each soaking, the porous anodes are dried at temperatures of about 80° to about 100° C., preferably about 85° to about 95° C. After each drying, or after the final drying, the porous anode may be weighed to determine the amount of hydrated salt crystals deposited on the porous anode by comparison with the initial, untreated weight.

Formation of the actual stabilizer, for example lithium chromite, from a water soluble salt, such as lithium dichromate, occurs in at least two steps. A hydrated salt is formed when the anode is dried at temperatures of about 80° to about 100° C., such as hydrated lithium dichromate ($Li_2Cr_2OH_7.2H_2O$). The hydrated salt distributed on the surface of the porous anode metal particles is then dehydrated at temperatures of about 110° to about 160° C., preferably about 120° to about 140° C. to form lithium dichromate ($Li_2Cr_2O_7$) Porous anode metal particles covered with lithium dichromate particles are then heated to about 600° to about 700° C., preferably about 625° to about 675° C. in a hydrogen-rich atmosphere with sufficient hydrogen for reaction of lithium dichromate to form lithium chromite, $LiCrO_2$, the actual stabilizer. Analogous treatments may be achieved with water soluble salts of aluminum and zirconium. Alternatively, the removal of crystallization water and the formation of the actual stabilizer may occur in one heating operation or in situ in a molten carbonates fuel cell when a porous metallic anode which has been impregnated in an aqueous solution containing salts of a stabilizer and dried of free water is subjected to molten carbonates fuel cell operating temperatures and conditions. If the actual stabilizer, such as lithium chromite, is allowed to form in situ, the conventional porous metallic anode need only be soaked in an aqueous solution having dissolved therein salts of a stabilizer and dried at temperatures of approximately 90° C. prior to installation and operation in a molten carbonates fuel cell.

It is desired that fine particles of stabilizer be distributed over the surface area of metal particulates of porous anodes according to the present invention comprise about 0.5 to about 20 weight percent, preferably about 1.0 to about 10 weight percent based upon the total weight of the porous anode.

Although lithium chromate and lithium dichromate are the preferred water soluble chromium salts for use as stabilizing agents according to the process of the present invention, the other water soluble chromium, aluminum and zirconium compounds as disclosed above may be used as well. Chromium salts which do not contain lithium, such as potassium or sodium salts, must undergo an ionic exchange reaction with lithium compounds in the molten carbonates electrolyte to form the desired sintering inhibitor such as lithium chromite ($LiCrO_2$). When water soluble chromium, aluminum and zirconium compounds which do not contain lithium are used according to the process of the present invention, it is preferred that dehydration of the crystallization water and formation of the desired surface stabilizing agent, such as lithium chromite, occur in situ under molten carbonate fuel cell operating conditions.

Porous metallic anodes stabilized by treatment with water soluble salts of a stabilizing agent and subsequently heat treated in a hydrogen-rich atmosphere to form the stabilizing agent, such as lithium chromite ($LiCrO_2$), provide superior performance over long term molten carbonates fuel cell operation, as compared to porous anodes which are produced by mixing solid particulates of base metal and surface stabilizing agent. The process of this invention provides metallic porous anodes wherein the stabilizing agent is more evenly and more finely distributed by impregnation in an aqueous solution containing a water soluble salt of the stabilizing agent and as a result, the structural stability of the anode is enhanced.

In cases of nickel and copper porous molten carbonate fuel cell anodes with lithium chromite ($LiCrO_2$) stabilizing agent fabricated according to this invention, x-ray fluorescence and x-ray diffraction of anodes used in fuel cells showed that the electrodes contained in addition to nickel or copper, principally only lithium chromite. Energy dispersive x-ray analysis showed the particles of base material, nickel or copper, well and uniformly covered by the lithium chromite. After treatment by the process of this invention, the stabilized porous metallic anodes exhibit a shift in pore size distribution showing a much larger percentage of pores smaller than 1 micron and a much larger surface area than corresponding non-stabilized anodes. Scanning electron microscope analysis show very little growth of nickel or copper particles treated according to this invention and after up to 1000 and 2500 hour molten fuel cell operation.

The following specific examples are intended to be illustrative only and are not intended to limit the present invention in any way.

EXAMPLE I

Four conventionally prepared porous anodes, two nickel and two copper were treated according to the process of the present invention. The essentially pure metallic electrodes were weighed to determine an initial mass. Each electrode was soaked two times in an aqueous saturated solution of dissolved lithium dichromate ($Li_2Cr_2O_7$), dried at about 90° C. between soakings for 1 to 2 hours and weighed after each drying. The amount of hydrated lithium dichromate ($Li_2Cr_2O_7 \cdot 2H_2O$) deposited on each electrode was determined by mass differences. Each anode was then heated, first to 115° C. for one hour and later to 140° C. for one hour to remove the crystallization water. The weight of $Li_2Cr_2O_7$ additive deposited on each anode was determined by mass differences. The electrodes were then heat treated at about 650° C. in a reducing environment for about 3 hours to produce the desired stabilizer lithium chromite ($LiCrO_2$). The weight of $LiCrO_2$ deposited on each anode was determined by mass differences. As a result of treatment according to the process of the present invention, the amount of $LiCrO_2$ as shown in Table 1 was deposited on each porous metallic anode.

TABLE 1

| Treatment | Nickel | | Copper | |
|---|---|---|---|---|
| | Mass in Grams | | | |
| Initial porous anode, as received | .7580 | .7935 | .8004 | .8092 |
| First Soaking + heat to 90° C. | .8488 | .9219 | .9094 | .9283 |
| Second Soaking + heat to 90° C. | .9168 | .9600 | .9665 | .9248 |
| Amount $Li_2Cr_2O_7\ 2H_2O$ | .1588 | .1665 | .1661 | .1156 |
| Heat to 115° C. | .8864 | .9231 | .9376 | .9144 |
| Heat to 140° C. | .8864 | .9223 | .9357 | .9133 |
| Amount $Li_2Cr_2O_7$ | .1284 | .1283 | .1353 | .1041 |
| Heat to 650° C. in reducing atmosphere | .8250 | .8696 | .8813 | .8775 |
| Amount $LiCr_2O$ | .0670 | .0761 | .0809 | .0683 |
| % $LiCrO_2$ of total mass/anode | 8.12 | 8.75 | 9.18 | 7.78 |

EXAMPLE II

Various anodes as indicated were operated in bench scale molten carbonate fuel cells. Bench scale cells having aluminum foil in the anode wet seal area, a nickel anode current collector, anode as indicated in Table II, nickel cathode, stainless steel 316 cathode current collector, and a hot pressed electrolyte tile of 55 to 60 weight percent of the 62 mole percent $Li_2CO_3$, 38 mole percent $K_2CO_3$ eutectic carbonate mixture was operated at 650° C. and 160 mA/cm$^2$.

TABLE II

| | Initial Structure | | | | Structure After Cell Operation | | | |
|---|---|---|---|---|---|---|---|---|
| Anode | Surface M$^2$/gm | Porosity % | Mean Pore Size | 80% Pore Range microns | Cell Operation Time Hours | Surface M$^2$gm | Porosity % | Mean Pore Size | 80% Pore Range microns |
| Ni (pure) | 0.14 | 66.0 | 4.0 | 2.2–7.0 | 2000 | 0.07 | 52.0 | 5.0 | 3.6–16.0 |
| Ni + 10% Cr-Solids Mixed According to U.S. Pat. No. 4,247,604 | 0.11 | 63.0 | 5.3 | 3.1–9.6 | 1300 | 7.18 | 58.2 | 3.0 | 0.3–5.2 |
| Ni-Untreated | 0.17 | 60.7 | 3.4 | 2.2–5.3 | | | | | |
| Ni + 4.95% LiCr$_2$O Aqueous impregnation according to this invention | 7.50 | 62.4 | 4.2 | 0.2–6.5 | 1000 | 9.02 | 58.2 | 3.6 | 0.2–5.2 |
| Ni-Untreated | 0.17 | 61.5 | 3.6 | 2.1–5.4 | | | | | |
| Ni + 4.95% LiCr$_2$O Aqueous impregnation according to this invention | | | | | 830 | 11.65 | 55.7 | 3.6 | 0.1–5.0 |
| Cu-Untreated | — | 70.0 | 4.3 | 2.4–9.4 | | | | | |
| Cu + 7.71% LiCr$_2$O Aqueous impregnation according to | | | | | 800 | 5.10 | 46.0 | 0.8 | 0.05–5.46 |

TABLE II-continued

| Anode | Initial Structure | | | | Structure After Cell Operation | | | | |
|---|---|---|---|---|---|---|---|---|---|
| | Surface M²/gm | Porosity % | Mean Pore Size | 80% Pore Range microns | Cell Operation Time Hours | Surface M²gm | Porosity % | Mean Pore Size | 80% Pore Range microns |
| this invention | | | | | | | | | |

Laboratory scale molten carbonate fuel cells, 3 cm² in size having reference electrode with Ni+5% LiCr₂O anodes fabricated according to this invention showed similar performance of 850-875 mV cell potential as cells with Ni+10% Cr anodes fabricated according to the method of U.S. Pat. No. 4,247,604, when the only difference between the two types of cells was the anode (the other components, temperature, gas compositions and utilizations were maintained constant), and showed good stable performance over 2000 hours of operation. A similar laboratory scale cell with a Cu+10% LiCr₂O anode reinforced with copper screens and fabricated according to this invention showed only 10 to 40 mV lower cell potential than the Ni+10% Cr anode fabricated according to the method of U.S. Pat. No. 4,247,604. Very stable cell operation was achieved for up to 2550 hours.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for treatment of molten carbonate fuel cell porous metallic anodes to produce stabilized molten carbonate fuel cell porous metallic anodes comprising the steps of:
   impregnating a porous metallic anode comprising principally metal particles selected from the group consisting of: copper, cobalt, nickel and alloys and mixtures thereof, in an aqueous solution having dissolved therein a water soluble salt of a structure stabilizing agent;
   drying said impregnated porous anode at temperatures of about 80° C. to about 100° C. evaporating free water to form hydrated salts of said stabilizing agent on the surface of said metal particles;
   heating said impregnated dried porous anodes to a temperature of about 110° C. to about 160° C., dehydrating said hydrated compounds on the surface of said metal particles; and
   heating said porous anodes to a temperature of about 600° C. to about 700° C. in a reducing atmosphere forming particles of said stabilizing agent in reduced form on the surface of said metal particles.

2. The process of claim 1 wherein said water soluble salt is selected from the group consisting of chromium, zirconium, aluminum, and mixtures thereof.

3. The process of claim 1 wherein said water soluble salt is selected from the group consisting of lithium chromate, lithium dichromate, and mixtures thereof.

4. The process of claim 1 wherein said aqueous solution is a saturated solution of said water soluble salt.

5. The process of claim 1 wherein said metallic anode is impregnated by soaking in said aqueous solution for about 1 to about 15 minutes.

6. The process of claim 5 wherein a vacuum is applied to aid said impregnating.

7. The process of claim 1 wherein said drying is at about 85° to about 95° C.

8. The process of claim 1 wherein said dehydrating is at about 120° to about 140° C.

9. The process of claim 1 wherein said anodes are heated to a temperature of about 625° to about 675° C.

10. The process of claim 1 wherein said heating to about 600° to about 700° C. takes place in situ in a molten carbonate fuel cell.

11. The process of claim 10 wherein said water soluble salts comprise other than lithium salts and electrolyte of said molten carbonate fuel cell comprises at least one lithium compound.

12. The process of claim 1 wherein said stabilizing agent comprises about 0.5 to about 20 weight percent, based upon total anode weight.

13. The process of claim 1 wherein said stabilizing agent comprises about 1.0 to about 10 weight percent, based upon total anode weight.

14. The process of claim 1 wherein said water soluble salt is selected from the group consisting of chromium, zirconium, aluminum, and mixtures thereof, said aqueous solution is a saturated solution of said water soluble salt, and said stabilizing agent comprises about 0.5 to about 20 weight percent, based upon total anode weight.

15. The process of claim 14 wherein said heat treating to about 600° to about 700° C. takes place in a hydrogen-rich environment prior to assembly of said anode in said fuel cell.

16. The process of claim 1 wherein said water soluble salt is selected from the group consisting of chromium, zirconium, aluminum, and mixtures thereof, said aqueous solution is a saturated solution of said water soluble salt, said heating to about 600° to about 700° C. takes place in situ in a molten carbonate fuel cell, and said water soluble salts comprise other than lithium salts and electrolyte of said molten carbonate fuel cell comprises at least one lithium compound.

17. A process for producing stabilized molten carbonate fuel cell porous metallic anodes comprising the steps of:
   impregnating a porous metallic anode comprising principally metal particles selected from the group consisting of: copper, cobalt, nickel and alloys and mixtures thereof, in an aqueous solution having dissolved therein a water soluble salt of a structure stabilizing agent, said water soluble salt is selected from the group consisting of lithium chromate, lithium dichromate, potassium chromate, potassium dichromate, sodium chromate, sodium dichromate, chromic formate, chromous acetate, chromous formate, chromous oxalate, aluminum nitrate, zirconium nitrate, potassium aluminum oxide, and mixtures thereof;
   drying said impregnated porous anode at temperatures of about 80° C. to about 100° C. evaporating free water to form hydrated salts of said stabilizing agent on the surface of said metal particles;

heating said impregnated dried porous anode to a temperature of about 110° C. to about 160° C., dehydrating said hydrated compounds on the surface of said metal particles; and heating said porous anode to a temperature of about 600° C. to about 700° C. in a reducing atmosphere forming particles of said stabilizing agent on the surface of said metal particles.

18. A process for producing stabilized molten carbonate fuel cell porous metallic anodes comprising the steps of:

impregnating a porous metallic anode comprising principally metal particles selected from the group consisting of: copper, cobalt, nickel and alloys and mixtures thereof, in an aqueous solution having dissolved therein a water soluble salt of a structure stabilizing agent;

drying said impregnated porous anode at temperatures of about 80° C. to about 100° C. evaporating free water to form hydrated salts of said stabilizing agent on the surface of said metal particles and repeating said impregnating and drying steps;

heating said impregnated dried porous anode to a temperature of about 100° C. to about 160° C., dehydrating said hydrated compounds on the surface of said metal particles; and heating said porous anode to a temperature of about 600° C. to about 700° C. in a reducing atmosphere forming particles of said stabilizing agent on the surface of said metal particles.

19. A process for producing stabilized molten carbonate fuel cell porous metallic anodes comprising the steps of:

impregnating a porous metallic anode comprising principally metal particles selected from the group consisting of: copper, cobalt, nickel and alloys and mixtures thereof, in an aqueous solution having dissolved therein a water soluble salt of a structure stabilizing agent;

drying said impregnated porous anode at temperatures of about 80° C. to about 100° C. evaporating free water to form hydrated salts of said stabilizing agent on the surface of said metal particles;

heating said impregnated dried porous anode to a temperature of about 110° C. to about 160° C., dehydrating said hydrated compounds on the surface of said metal particles; and heating said porous anode to a temperature of about 600° C. to about 700° C. in a hydrogen-rich environment prior to assembly of said anode in said fuel cell forming particles of said stabilizing agent on the surface of said metal particles.

20. The process of claim 17 wherein said water soluble salt is selected from the group consisting of lithium chromate, lithium dichromate, and mixtures thereof.

21. The process of claim 17 wherein said aqueous solution is a saturated solution of said water soluble salt.

22. The process of claim 17 wherein said metallic anode is impregnated by soaking in said aqueous solution for about 1 to about 15 minutes.

23. The process of claim 17 wherein said drying is at about 85° to about 95° C.

24. The process of claim 17 wherein said dehydrating is at about 120° to about 140° C.

25. The process of claim 17 wherein said anodes are heated to a temperature of about 625° to about 675° C.

26. The process of claim 17 wherein said heating to about 600° to about 700° C. takes place in situ in a molten carbonate fuel cell.

27. The process of claim 26 wherein said water soluble salts comprise other than lithium salts and electrolyte of said molten carbonate fuel cell comprises at least one lithium compound.

28. The process of claim 17 wherein said stabilizing agent comprises about 0.5 to about 20 weight percent, based upon total anode weight.

29. The process of claim 17 wherein said stabilizing agent comprises about 1.0 to about 10 weight percent, based upon total anode weight.

30. The process of claim 17 wherein said water soluble salt is selected from the group consisting of chromium, zirconium, aluminum, and mixtures thereof, said aqueous solution is a saturated solution of said water soluble salt, and said stabilizing agent comprises about 0.5 to about 20 weight percent, based upon total anode weight.

31. The process of claim 17 wherein said water soluble salt is selected from the group consisting of chromium, zirconium, aluminum, and mixtures thereof, said aqueous solution is a saturated solution of said water soluble salt, said heating to about 600° to about 700° C. takes place in situ in a molten carbonate fuel cell, and said water soluble salts comprise other than lithium salts and electrolyte of said molten carbonate fuel cell comprises at least one lithium compound.

* * * * *